US007113862B2

(12) United States Patent
Radue

(10) Patent No.: US 7,113,862 B2
(45) Date of Patent: Sep. 26, 2006

(54) METHOD AND SYSTEM FOR FUEL INJECTOR TIME DELAY INSTALLATION

(75) Inventor: Martin Radue, Kenosha, WI (US)

(73) Assignee: BRP US Inc., Sturtevant, WI (US)

( * ) Notice: Subject to any disclaimer, the term of this patent is extended or adjusted under 35 U.S.C. 154(b) by 274 days.

(21) Appl. No.: 10/605,168

(22) Filed: Sep. 12, 2003

(65) Prior Publication Data

US 2005/0060085 A1 Mar. 17, 2005

(51) Int. Cl.
*B60T 7/12* (2006.01)

(52) U.S. Cl. ...................... 701/103; 701/104; 123/478; 123/480; 123/472; 123/475

(58) Field of Classification Search ................ 123/472, 123/475, 478–480; 701/103, 104
See application file for complete search history.

(56) References Cited

U.S. PATENT DOCUMENTS 6,360,161 B1 3/2002 Francis et al. ................ 70/115
6,671,611 B1 * 12/2003 Peltier ........................ 701/104
6,694,929 B1 * 2/2004 Skrzypchak et al. ..... 123/41.31
6,775,607 B1 * 8/2004 Koerner ...................... 701/104

* cited by examiner

*Primary Examiner*—Tony M. Argenbright
*Assistant Examiner*—Johnny H. Hoang
(74) *Attorney, Agent, or Firm*—Osler, Hoskin & Harcourt LLP

(57) ABSTRACT

State-of-the-art fuel injectors have an inherent time delay that is determined by an elapsed time from the time an electrical signal is received by the fuel injector from an ECU to the time that fuel is actually initially injected into the cylinder. That time is currently an average time and therefore the fuel injectors must be manufactured with very precise tolerances. The present invention includes a method and apparatus that allows the use of production fuel injectors that are more economical to manufacture by allowing wider tolerances. The invention includes determining the actual time delay for each fuel injector. The fuel injectors are supplied with a computer program and a data file containing the time delay determined especially for that particular fuel injector.

8 Claims, 4 Drawing Sheets

METHOD AND SYSTEM FOR FUEL INJECTOR TIME DELAY INSTALLATION

BACKGROUND OF INVENTION

The present invention relates generally to fuel injection systems for internal combustion engines, and more particularly to, a method and apparatus for obtaining and installing fuel injector data that is specific to a particular fuel injector in an engine controller.

In U.S. Pat. No. 6,360,161 of Francis et al., there is shown and described a method and system for fuel injector coefficient installation. In that patent, there is a method and system that allows the use of less precisely manufactured fuel injectors to be used in engines while still achieving the optimum of performance by insuring that each individual injector deliver a predetermined pulse width of fuel.

The advanced fuel injectors used today are defined by a third-order polynomial and, therefore, in accordance with the Francis et al. patent, the coefficients for the third order polynomial are individually obtained for each fuel injector and those coefficients are stored in a read/write memory. That data representative of the coefficients is eventually introduced into the memory of an ECU within the engine in order to achieve the desirability that each injector deliver approximately the same quantity of fuel, in approximately the same timed relationship to the engine for proper operation.

Accordingly, in the aforementioned Francis et al. patent, the inventive method and system relate, in part, to replacing the fuel injector coefficient data in an ECU of a fuel injected engine. The method and system involve obtaining and storing coefficient data that is specific to a particular fuel injector, and providing that coefficient data, together with the associated fuel injector, to a customer for replacement in an engine.

A computer program was also supplied to read out the existing coefficient data from the ECU before writing the replacement coefficient data so that restoration of the existing coefficient data, and the associated fuel injector, can be accomplished if the replacement fuel injector does not correct the service problem experienced. The system includes a log file to prevent misuse of the coefficient data by tracking how the program and data are used. That is, once the replacement coefficient data is used, the only way to reuse the data is if the original existing coefficient data is restored in the ECU from which it originated. If the data is restored, and it is assumed that the original fuel injector is reinstalled in the original cylinder from which it came, the program allows the reuse of the replacement coefficient data.

While the aforementioned method and system of the Francis et al. patent is sufficient to insure that the coefficients are input into the memory of the ECU in order to determine the third order polynomial function of each individual fuel injector, and therefore that the individual fuel injector is able to accurately inject the pulse width of fuel into the cylinder, there is an additional bit of information or data that is also necessary to the proper functioning of the engine and which is related to the timing of the fuel injection into the cylinder.

It is, of course, also well known that the timing of that introduction of the injected fuel into the cylinder is critical to the performance of the engine and that timing function was also illustrated in the aforedescribed Francis et al. patent. The timing of the injected fuel changes with RPM of the engine, that is, at slow speeds the injection of fuel is quite close to the timing ignition pulses while, at higher RPM, the fuel pulses are considerably in advance of the timing ignition pulses. The fuel injector delivers the pulse or injection of fuel after being activated by an electrical signal that is controlled by the ECU of the engine. A problem, however, exists in the timing of the actual delivery of fuel from an injector after the injector has received an electrical signal activating the injector. Thus, while timing ignition pulses can be quite accurate, the actual introduction of the fuel from a fuel injector after the injector has received the electrical signal to inject the fuel is not as accurate, and depends on the particular characteristic of the fuel injector, and all fuel injectors may have some differences in actual delivery time of the pulse of fuel after being activated by the electrical signal to the fuel injector.

As can now be understood, the time of the actual injection of fuel into the cylinder is critical to the performance of the engine, however, that pulse of fuel is not injected at the time the injector receives the electrical signal activating the fuel injector. Instead, there is a time delay between the time that the electrical signal reaches the fuel injector and the actual delivery of a pulse of fuel by that injector, and that delay is due to the need for pressure to build up in the fuel injector before the actual pulse of fuel is delivered.

Accordingly, in order to achieve the desired performance of the engine, it is necessary for the data or information relating to the time delay of a fuel injector to be present in the ECU so that the ECU can know how far in advance the electrical signal must be transmitted to the fuel injector in order to inject the fuel at the precise desired time into the cylinder.

At the present, the time delay that is utilized in determine the timing of the electrical signal to activate a fuel injector is taken as an average value and therefore each injector must be constructed with relatively tight tolerances in order to make that average delay time a valid bit of data to be used in the engine to determine the timing of the pulse of fuel. It would, therefore, be advantageous to be able to have the exact time delay for a particular fuel injector and use that actual data so as to allow greater tolerances in the manufacturing of fuel injectors, and therefore lower costs, while still maintaining the accuracy of the precise time the fuel is injected into a cylinder.

BRIEF DESCRIPTION OF INVENTION

The present invention solves the aforementioned drawbacks by providing a fuel injector time delay installation.

Accordingly, by determining the time delay for an individual injector, the amount of the time delay for any fuel injector can be electronically recorded and accompany the injector as it is installed in an engine. The delay time data can be input, at that time, to the ECU so that the ECU can take the delay time into account when sending the electrical signal to a fuel injector to activate the injector. In the preferred embodiment, the time delay for an injector can be determined at the same time that the coefficients are determined in accordance with the teachings of the Francis et al. patent and the time delay date recorded on some memory device along with the coefficients.

Therefore, in accordance with one aspect of the invention, a system to enter fuel injector data in an ECU when installing or replacing a fuel injector in an engine is disclosed. The system includes a computer readable storage medium operable with a service computer connectable to transmit data to an ECU of a fuel injected engine. The computer readable storage medium has thereon replacement fuel injector delay time that is precise to the fuel injector to be installed in the engine. The computer readable storage medium also has a computer program which, when executed by the service computer, causes the service computer to write the replacement fuel injector time delay data to the ECU for a specified original and/or replacement fuel injector.

In accordance with another aspect of the invention, a fuel injector service pack is disclosed that includes a single replacement fuel injector and a computer readable storage medium. The single replacement fuel injector of the service pack has a time delay in the form of a fixed amount of time that is experimentally determined for that particular fuel injector. The computer readable storage medium has stored thereon a data file containing a serial number and the time delay figure for that single replacement fuel injector.

The storage medium also has a computer program that includes instructions which, when executed by the computer, causes the computer to allow identification of a cylinder in the fuel injected engine for which a fuel injector is to be replaced. The computer is also caused to read and store existing fuel injector time delay data from an ECU of the fuel injected engine and write the custom set of time delay information from the data file to the ECU for use with the single replacement fuel injector.

In accordance with yet another aspect of the invention, a method of servicing an engine requiring fuel injector replacement includes identifying a fuel injector in need of replacement by cylinder number, establishing communication between a service computer and an ECU of the engine, and downloading ECU, engine, and fuel injector data from the ECU to the service computer. The method next includes writing replacement fuel injector time delay data to the ECU for a replacement fuel injector for the specific cylinder identified. The method next includes installing the replacement fuel injector in that cylinder of the fuel injected engine.

In accordance with yet another aspect of the invention, a method is disclosed for providing fuel injectors for a fuel injected engine that includes the steps of supplying a production fuel injector with relaxed tolerances as compared to a standard service fuel injector, and acquiring time delay data representing the delay time measured between the time an electrical signal is sent to the fuel injector to activate that injector to the actual commencement of the delivery of the pulse of fuel from that particular production fuel injector. The method of providing fuel injectors also includes writing the data representative of the time delay to a transportable computer readable medium and providing a computer program on a transportable computer readable storage medium that, when executed, causes the computer to load the time delay data into an ECU of an engine in which the production fuel injector is to be installed.

The method and apparatus of the present invention allows for the use of a more economical production fuel injector when servicing an engine in the field. These production fuel injectors can be manufactured with relaxed tolerances since a specific set of time delays are determined experimentally and supplied for each injector such that the time delays result in an accurate timing for the introduction of fuel from an injector into a cylinder.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The operating environment of the present invention will be described with respect to a 2-cycle engine, however, it will be appreciated that this invention is equally applicable for use with a 4-cycle engine, a diesel engine, or any other type of internal combustion engine using fuel injectors. Such engines can be found in boats, snowmobiles, ATVs, personal watercrafts, motorcycles, mopeds, lawn and garden equipment, automobiles, and the like.

Figure 1A:
FIG. 1A (PRIOR ART)
FIGS. 1A and 1B are graphs illustrating how the position of the fuel injection pulse and the pulse width as well as the ignition timing may be varied with respect to crankshaft position.

It is well known in the art that engine torque, speed, emissions, and temperature can be optimized by adjusting the amount of fuel applied to the cylinders and the time at which that fuel is ignited by using fuel injectors such as that disclosed in U.S. Pat. No. 5,687,050, incorporated herein by reference in its entirety. The amount of fuel injected into an engine cylinder is typically controlled by the width of the control pulse applied to the fuel injector to hold it open for a predetermined period of time and then closing it, thus allowing only a particular quantity of fuel to be injected into the cylinder. The timing, on the other hand, is determined by the timing of the initiation of the electrical signal with mechanical positioning of the engine that is controlled by the ECU. Thus, as can be seen in FIG. 1A, curve 10 represents the pulse applied to a fuel injector to cause a certain amount of fuel to be injected into the cylinder. In a like manner, pulses 12 indicate that the ignition pulses are supplied to the spark plug to ignite the fuel some predetermined period of time after injection of the fuel into the cylinders.

Figure 1B:
FIG. 1B (PRIOR ART)

It is also well known that as the RPM of the engine increases, the fuel must be injected into the cylinders at a much earlier crankshaft position for most efficient operation of the engine. Thus, as shown in FIG. 1B, pulse 10 is moved a greater distance away from the ignition pulses 12 at high engine RPMs. Also, engine operation can be optimized by adjusting the pulse-width 10 to a width 10" or 10", as shown in FIG. 1B, while monitoring the desired engine characteristics such as torque, RPM, emissions, and temperature. In a similar manner, if the ignition timing pulses 12 are varied between a range 12" or 12", while observing the desired engine operating characteristics such as torque, engine speed, emissions, and temperature, operating conditions of the engine could be further improved.

The information gleaned from the curves of FIGS. 1A and 1B, however, shows the criticality of not only the pulse width, related to the amount of fuel injected into the cylinder, but also the criticality of the timing of the fuel injected into the cylinder. Thus, it is important to the overall performance of the engine that the fuel be injected into the cylinder at precisely the correct time, and that such injection is directly related to the electrical signal that is sent to the fuel injector controlled by the electronic control unit (ECU) so that the electrical signal corresponds to the precise time that the pulse of fuel is to be introduced into the cylinder. Since, as explained, there is an inherent time delay between the time the electrical signal is sent to the fuel injector, to the actual time that the fuel is forced from that injector, it is preferable that such time delay be taken into account by the ECU. Accordingly, such time delay values should be known by the ECU in some manner.

Thus, in the present invention, the time delay value is ascertained by individually testing each fuel injector so that an actual time value is obtained and stored for that fuel injector. This value is then input into the ECU when the engine is originally manufactured, and/or a new time delay value input as a fuel injector is later replaced, so that the ECU has a correct time delay for each fuel injector rather than simply rely upon an average delay time for all fuel injectors.

Figure 2:
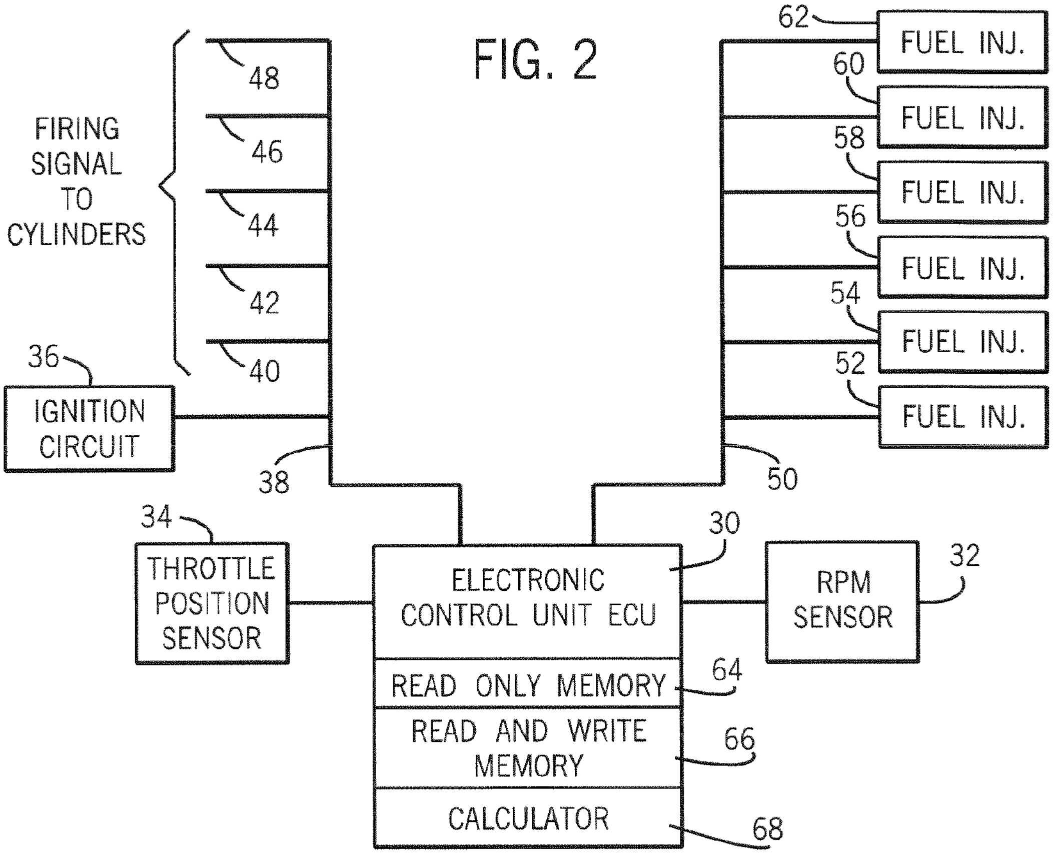
FIG. 2 is a block diagram of a system for illustrating circuitry for determining the appropriate timing for the activation of fuel injectors and optimize performance of the engine incorporating the present invention.

Referring now to FIG. 2 a block diagram is shown of an internal combustion engine assembly having an ECU 30 which receives inputs such as engine speed from RPM sensor 32 and throttle position from sensor 34. It will also be appreciated, that one of the primary purposes of an ECU is to control the ignition firing and timing of an ignition circuit 36 that receives a signal from ECU 30 on line 38. As shown, the control signal from ECU 30 and ignition circuit 36 controls firing of the engine cylinders as indicated by lines 40, 42, 44, 46 and 48. It is not unusual for modern internal combustion engines of all types, whether diesel or gasoline fueled, to use fuel injectors on each cylinder to provide fuel to the cylinder for combustion. Thus, as shown, ECU 30 further provides a control signal by means of line 50 to the fuel injector solenoids indicated at 52, 54, 56, 58, 60, and 62. Thus, each cylinder of an internal combustion engine receives both an ignition firing signal and a fuel injection signal from the ECU. While the number of fuel injectors typically matches the number of cylinders, the present invention is applicable to any number of fuel injectors and engine cylinders.

In addition to those functions provided by an engine ECU in the past, the ECU used in an engine assembled for this invention will further include a memory which may typically be a read-only memory 64 for storing a third-order equation such as $ax^3+bx^2+cxd=0$ and a read/write memory 66 having storage locations associated with each cylinder of the engine for storing the coefficient data in accordance with the aforementioned Francis et al. patent, as well as time delay data specifically associated with each fuel injector in accordance with the present invention.

Thus, the time delay for each fuel injector is preferably stored in read-only memory 64 that is provided to microprocessor or calculator 68 of ECU 30 and is associated with the cylinder for which the fuel injector is installed. That time delay is then used in the ECU 30 in determining the timing and thus sending the electrical signal to the appropriate fuel injector solenoids 52–62 to achieve efficient engine operation and at the same time offering reduced fuel injector construction costs.

Figure 3:
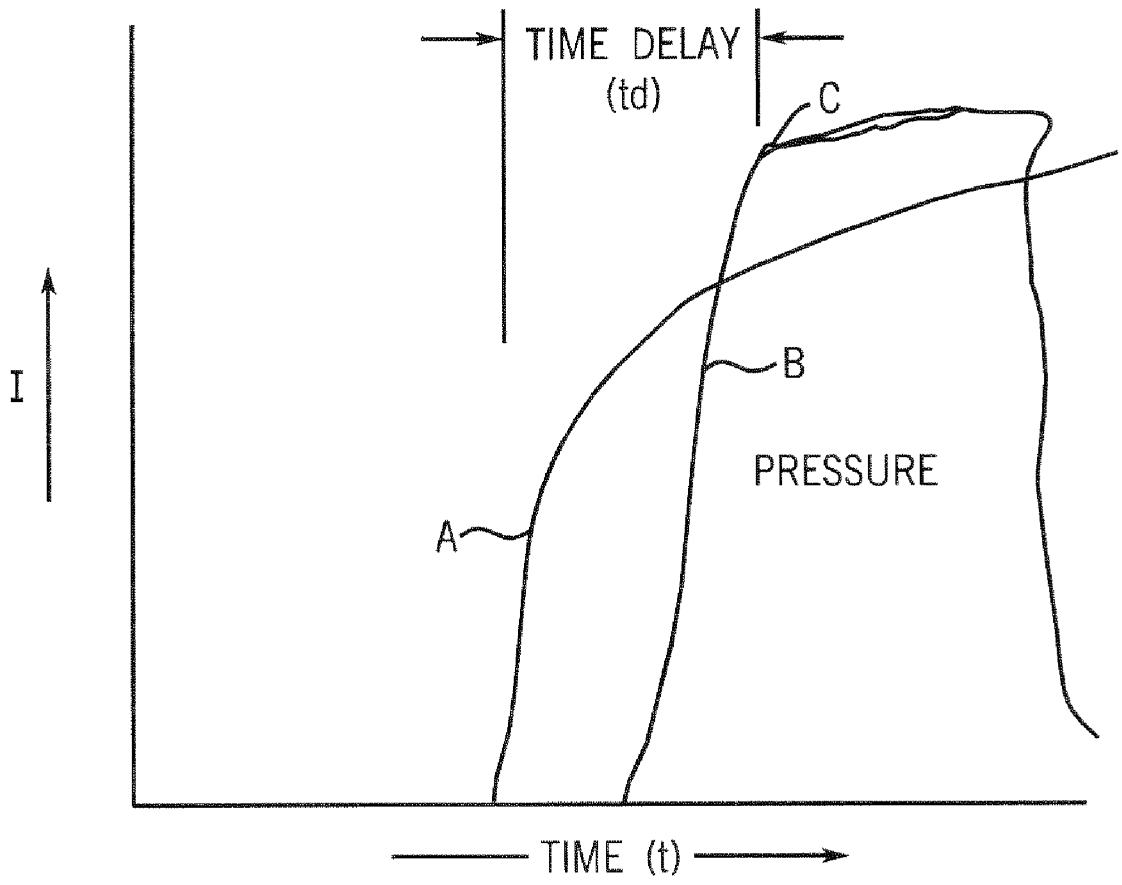
FIG. 3 shows curves that are obtained by the testing of a fuel injector in order to determine a delay time of a fuel injector.

Turning now to now to FIG. 3, taken along with FIG. 2, a set of curves is shown illustrating the time delay that is inherent in a typical fuel injector. As can be seen, the current to the fuel injector is plotted along the y-axis with time plotted along the x-axis. Curve A therefore illustrates the electrical signal that is communicated to the fuel injector solenoids 52–62 from the ECU 30 to activate the fuel injectors. Curve B illustrates the pressure within the fuel injector with respect to time and, as can be seen, there is a pressure build up in the fuel injector after receipt of the electrical signal from the ECU 30 such that the pressure reaches a point C where there is sufficient pressure established to dispense the fuel from the fuel injector and into the cylinder of the engine.

Thus, there is a time delay that is inherent in all fuel injectors indicated as "td" in FIG. 3 and this time delay is a characteristic of a particular fuel injector. As such, each fuel injector can be tested individually to determine its own time delay td and, as will be seen, that time delay td can be stored in a memory device, such as the read/write memory 66 of FIG. 2. This data can then accompany the fuel injector as it is initially installed in an engine or when the fuel injector is installed as a replacement for a worn fuel injector. In any case, the information relative to the time delay is communicated to the ECU 30 for the engine so that the ECU 30 can take that individual time delay into account when firing the fuel injector solenoids 52–62.

Figure 4:
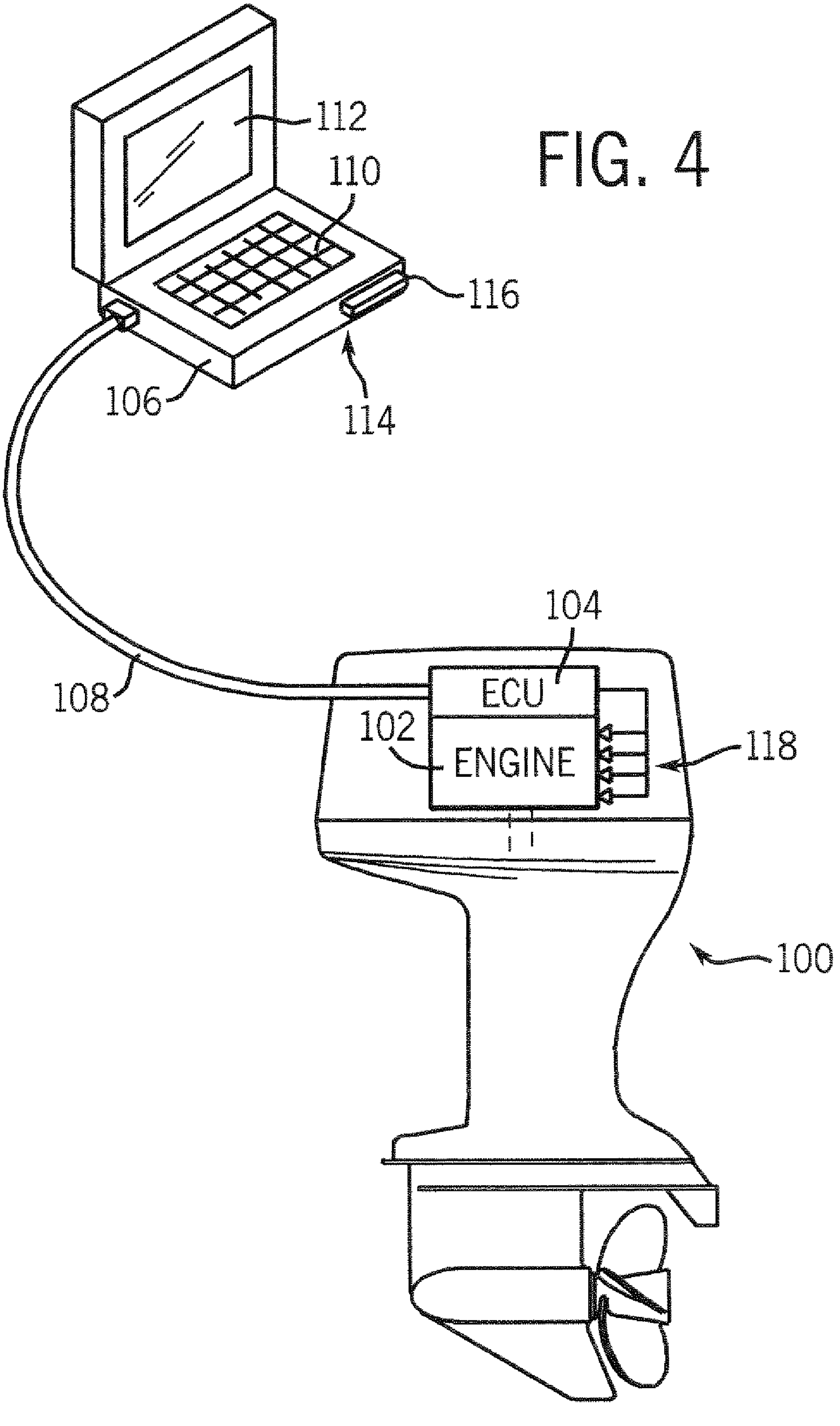
FIG. 4 is a perspective view of a fuel injected outboard marine engine having an ECU in communication with a portable processing unit, incorporating the present invention.

Referring now to FIG. 4, a perspective view of an outboard marine engine 100 having a fuel injected internal combustion engine 102, controlled by an ECU 104 is shown connected to a service computer 106. In a preferred embodiment, the service computer 106 is connected to the ECU 104 with a serial cable 108. However, it is contemplated that the service computer 106 can communicate with the ECU 104 in any number of ways, including but not limited to a SCSI (Small Computer System Interface) cable and card, a USB (Universal Serial Bus) cable and port, standard parallel connection, or with wireless technology, such as by infrared or high frequency transmissions. The service computer 106 may be a transportable laptop, a desktop computer, specialized service computer, or any other processing unit capable of executing and running a computer program. The service computer 106 has a keyboard 110, a monitor 112, and at least one disk drive 114. The drive 114 can receive an external disk or CD, or any other computer readable storage medium 116. The ECU 104 is individually connected to each of a number of fuel injectors 118 to control the performance of the engine, as previously described.

The invention includes a system to replace fuel injector data in an ECU 104 when replacing a fuel injector 118 in a fuel injected engine 102. The system includes a service computer 106 connectable to transmit data to the ECU 104. The service computer 106 has a computer readable storage medium 116 associated therewith and having thereon replacement fuel injector time delay, as previously described.

A computer program is also supplied and will be described further with reference to FIG. 5. In general, the computer program includes a set of instructions which, when executed by the service computer 106, causes the service computer 106 to download an identification characteristic from the ECU 104, determine which fuel injector is to be replaced, read existing fuel injector time delay data from the ECU for the fuel injector to be replaced, and save the existing fuel time delay data. The replacement fuel injector time delay data from the computer readable storage medium 116 is then written to the ECU 104 for the specific replacement fuel injector to be installed in engine 102.

Figure 5:
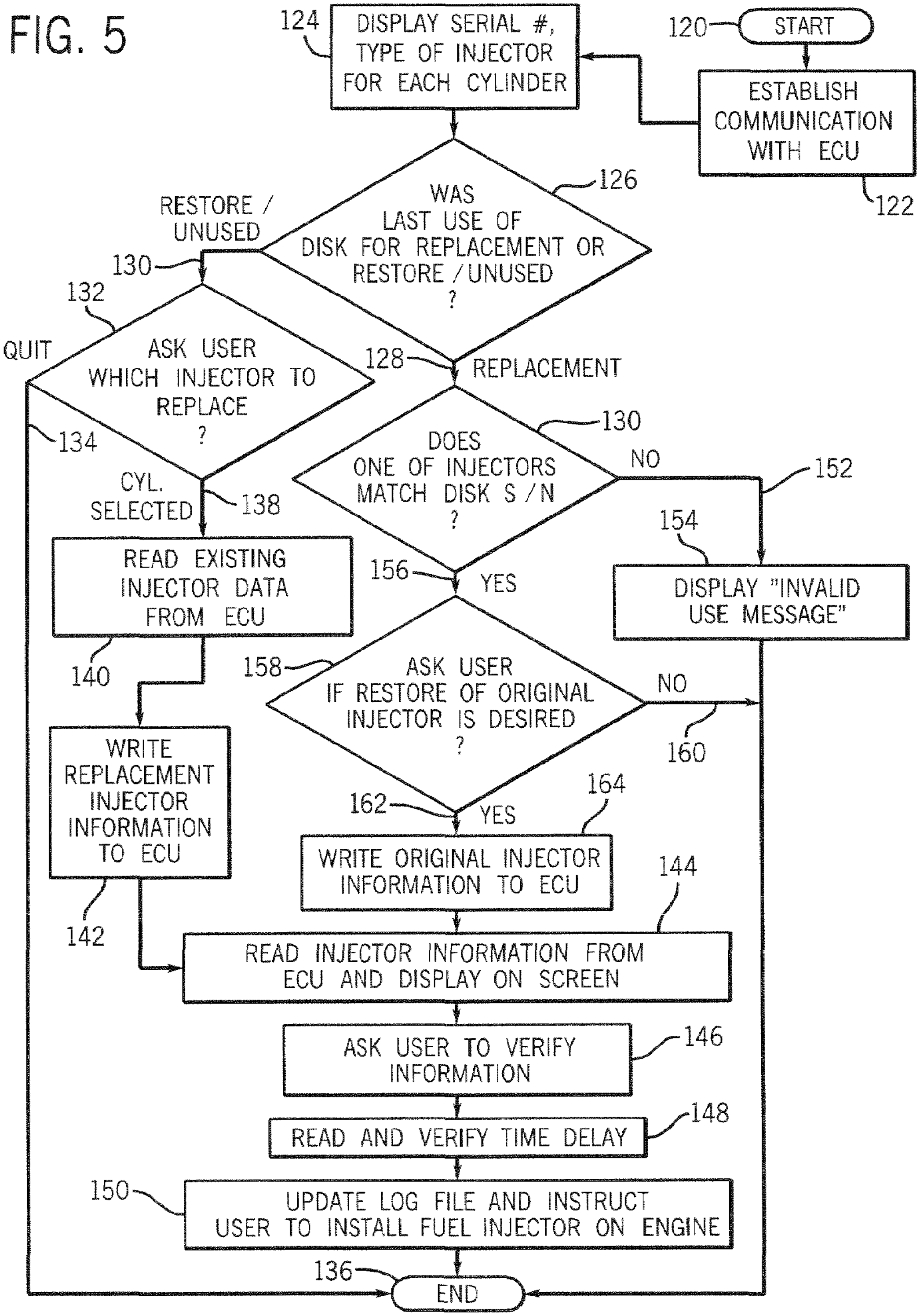
FIG. 5 is a flow chart showing an implementation of the present invention for use with the apparatus of FIG. 4.

Referring now to FIG. 5, the process of replacing an injector, together with the acts accomplished by the instructions of the computer program, are depicted in flow chart form. Upon initialization 120, communication between the ECU and the service computer is established at 122. The service computer downloads the serial number to identify the engine and the ECU, and downloads a fuel injector identification for each cylinder in the engine at 124. The service computer then displays the serial number and type of injector for each cylinder 124 and then checks 126 to see if there was a last use of the disk, and whether there had already been a restoration or if this is the first use of the disk 130.

The first time the computer program and the time delay data are used 126, 130, the user is first asked which injector is sought to be replaced 132. If, for some reason, the user does not wish to proceed, the user can exit the program 134, 135 by pressing the Esc key on the service computer 106, in accordance with one embodiment. This branch may also be followed if a time-out feature is added in case the user does not respond to the inquiry at 132. Further, the exit path is also desirable in the event a user wants to just confirm that the service computer is properly communicating with a given ECU even if replacement of an injector in that particular engine is not desired.

Once the user selects an injector to be replaced 132, 138, the service computer reads the existing time delay data from the ECU at 140 and saves it to the computer readable storage medium. The replacement fuel injector time delay data is then read from the storage medium and written to the ECU 142, and then read back from the ECU at 144 to verify accuracy of the written replacement fuel injector time delay data. The cylinder for which data was written, together with the fuel injector serial number can also be displayed on the service computer at 144 and the user is then asked to verify the accuracy of the information displayed 146. The service computer then checks the read back time delay data with the replacement time delay data from the computer readable storage medium and verifies that the time delay was written accurately 148. The service computer then updates a log file 150 to record the previous path and instruction set which was just previously executed. In the aforementioned example, the log file records that the last action taken was the first use, or the restore/unused function. Once the log file is updated, the user is instructed to physically install the replacement fuel injector in the particular cylinder previously selected 150, after which the program exists at 136.

Once the program has been initially used, it may be desired to restore the original time delay data because, for example, the new injector may not solve whatever service problem was being experienced. In such a case, the service personnel may wish to reinstall the old injector. Upon initialization 120 and after the service computer establishes communication with the ECU 122, the system acquires and displays the serial number and type of injectors for each cylinder 124. The program then determines that since the last use was a restore/unused function 130, the only permissible path to be taken is the restoration path 128. That is, the last use of the disk was for replacement of the original time delay data. The program now restricts the use of the original fuel injector time delay data by checking to see if one of the injectors in the engine matches the serial number on the computer readable storage medium 130. If it does not 152, an invalid use message is displayed 154 and the program exists at 136 indicating that the fuel injector that came with this disk and the replacement time delay data is not installed in this particular engine. However, if one of the serial numbers of the injectors in the engine matches the serial number on the disk 130, 156, the user is asked if the original fuel injector time delay data is to be restored in the ECU at 158. If the user does not wish to restore the original time delay data 160, the program then ends at 136.

However, assuming that the user wishes to restore the original fuel injector time delay data 158, 162, the original time delay data is written to the ECU at 164 and then read back at 144. The injector serial number and cylinder number are then displayed on the service computer. The user is then asked to verify the information displayed at 146 and the service computer verifies the accuracy of the time delay data that is written in the ECU with that on the computer readable storage medium at 148. The log file is then updated at 150 to indicate that the original fuel injector time delay data has been reinstalled in the engine which indicates that the new, replacement fuel injector time delay data, together with the new fuel injector may be reused in another engine. The user is then instructed to install the original injector back into the cylinder at issue in the engine at 150 and the program is then complete at 136.

It should now be apparent that the computer program, together with the data file and the new injector may be used in another cylinder or in another engine.

The present invention contemplates the use of a fuel injector of a type commonly referred to as single fluid pressure surge direct delivery fuel injector used in gasoline engines, and more specifically, in 2-stroke gasoline engines. One application of such an injector is a 2-stroke gasoline outboard marine engine, as shown in FIG. 4. These fuel injectors typically do not entrain the gasoline in a gaseous mixture before injection. However, it will be appreciated by those skilled in the art that the above-described invention is equally suited for use with other types of injectors. Another type of direct fuel delivery uses a high pressure pump for pressurizing a high pressure line to deliver fuel to the fuel injector through a fuel rail that delivers fuel to each injector. A pressure control valve may be coupled at one end of the fuel rail to regulate the level of pressure of the fuel supplied to the injectors to maintain a substantially constant pressure. The pressure may be maintained by dumping excess fuel back to the vapor separator through a suitable return line. The fuel rail may incorporate nipples that allow the fuel injectors to receive fuel from the fuel rail. Thus, in this case, a substantially steady pressure differential, as opposed to a pressure surge, between the fuel rail and the nipples cause the fuel to be injected into the fuel chamber. Another example of direct fuel injection is a direct dual-fluid injection system that includes a compressor or other compressing means configured to provide a source of gas under pressure to effect injection of the fuel to the engine. That is, fuel injectors that deliver a metered individual quantity of fuel entrained in a gaseous mixture. It is to be understood, however, that the present invention is not limited to any particular type of direct fuel injector.

Accordingly, the invention includes a method of servicing an engine requiring fuel injector replacement that includes identifying a fuel injector in need of replacement by cylinder number and establishing communication between a service computer and an ECU of the engine. The method next includes downloading identification of the ECU, the engine, and the fuel injector from the ECU to the service computer, writing replacement fuel injector time delay data into the ECU for a given replacement fuel injector for the cylinder number identified, and installing the replacement fuel injector in the cylinder number identified.

Preferably, the method includes downloading and storing the existing time delay data prior to writing over the memory locations containing the coefficient data, and then restricting use to restoration in the engine from which it was originally downloaded. In this preferred embodiment, the method includes displaying an injector serial number, an injector-type for each cylinder, determining if the replacement fuel injector time delay data has been uploaded previously, and if so, determining whether an injector serial number in the engine matches a serial number of the replacement fuel injector. If there is a match, the restoration is allowed to proceed by uploading the existing fuel injector time delay data back into the ECU. In order to verify the data loaded in the ECU, the method also includes reading the written replacement time delay coefficient data back from the ECU, displaying the cylinder number in which the replacement fuel injector is to be installed so that a user can verify the cylinder number. The written replacement fuel injector time delay data is then verified by comparing the data with the replacement fuel injector time delay data on the computer readable storage medium. The method includes supplying a production fuel and wherein the production fuel injector is tested to determine the time delay for that injector. The method includes supplying a computer readable or readable/writable storage medium, such as a CD or a computer disk, with the production fuel injector wherein the computer readable storage medium has stored thereon the time delay information that corresponds to the particular production fuel injector and a computer program that is capable of causing the service computer to execute instructions which effectuates the aforementioned steps of downloading, writing, and installing.

The invention also includes a fuel injector service pack which includes a single replacement fuel injector and a computer readable storage medium. The fuel injector has a time delay that is experimentally determined for that particular fuel injector. The computer readable storage medium has at least a data file and a computer program stored thereon. The computer file contains a serial number of the replacement fuel injector and the custom time delay for the replacement fuel injector. The computer program stored on the computer readable storage medium includes instructions which when executed by the computer, cause the computer to (1) allow identification of a cylinder in a fuel injected engine for which a fuel injector is to be replaced, (2) read and store existing fuel injector time delay data from an ECU of the fuel injected engine, and (3) write the custom time delay from the data file to the ECU for use with the single replacement fuel injector.

The computer readable storage medium also preferably includes a log file for which the computer program maintains a history of actions taken by the computer program to ensure that the determined time delay and the single replacement fuel injector are kept together. The computer program of the service pack also causes the computer to allow restoration of the existing fuel injector time delay data if the single replacement fuel injector did not solve a user's service problem. It also restricts use of the existing fuel injector time delay data and the original fuel injector by first writing a serial number of the single replacement fuel injector to the ECU when the determined time delay data is written to the ECU, and then later, if the last use of the computer program was to replace data, then reading and comparing each fuel injector serial number in the ECU with the serial number of the single replacement fuel injector as stored in the data file when the computer program receives another execution command. If a match exists, the software allows the existing fuel injector time delay data to be written back into the ECU and directs that the original fuel injector be reinstalled in the cylinder identified to match with the existing fuel time delay data.

The invention also includes a method of providing replacement fuel injectors for an engine including supplying a production fuel injector with relaxed tolerances as compared to a standard service injector, acquiring the time delay for that particular production fuel injector, and writing the time delay to a transportable computer readable medium. The method also includes providing a computer program on a transportable computer readable medium that, when executed, causes a computer to load the time delay data into an ECU of an engine in which the production fuel injector is to be installed.

In accordance with this aspect of the invention, each of the production fuel injectors is tested in order to determine its time delay to be supplied with that particular production fuel injector. Preferably, the method also includes the steps of reading and storing existing fuel injector time delay data from the ECU before writing over the data, and allowing restoration of that existing fuel injector time delay data if the replacement procedure did not result in a satisfactory outcome. The program restricts use of the existing fuel injector time delay data and the original fuel injector by writing a serial number of the production fuel injector to the ECU, and upon a request to restore data, reading and comparing each fuel injector serial number in the ECU with the serial number of the production fuel injector. If a match exists, the existing fuel injector time delay data is allowed to be written back into the ECU, if not, the execution is halted. The method includes directing that the original fuel injector be installed in the appropriate cylinder if that action was deemed allowable, as previously identified.

The present invention has been described in terms of the preferred embodiment, and it is recognized that equivalents, alternatives, and modifications, aside from those expressly stated, are possible and within the scope of the appending claims.

What is claimed is:

1. A method of servicing an engine requiring fuel injector replacement comprising the steps of:

identifying a fuel injector in need of replacement by cylinder number;

establishing communication between a service computer and an ECU of the engine;

downloading ECU, engine, and fuel injector data from the ECU to the service computer;

writing replacement fuel injector time delay data in the ECU for a replacement fuel injector for the cylinder number identified; and installing the replacement fuel injector in the cylinder number identified.

2. The method of claim 1 wherein the step of downloading further includes downloading existing fuel injector time delay data and the method further includes the steps of storing the existing fuel injector time delay data, and restricting a user to restoring the existing fuel injector time delay data in the engine from which it was downloaded.

3. The method of claim 2 further comprising the steps of:

displaying an injector serial number and injector type for each cylinder;

determining if the replacement fuel injector time delay data has been uploaded previously; and if so, determining whether any injector serial number in the engine matches a serial number of the replacement fuel injector; and if so, allowing restoration of the existing fuel injector time delay data.

4. The method of claim 1 further comprising the steps of:

reading the written replacement fuel injector time delay data back from the ECU;

displaying the cylinder number in which the replacement fuel injector is to be installed; and verifying the written replacement fuel injector time delay data with the replacement fuel injector time delay data.

5. The method of claim 1 further comprising the steps of:

supplying a production fuel injector having a time delay wherein the production fuel injector is tested to determine a particular time delay; and supplying a computer readable storage medium with the production fuel injector wherein the computer readable storage medium has stored thereon time delay data that correspond to that particular production fuel injector and a computer program that is capable of causing the service computer to execute the steps of downloading, writing and installing.

6. A fuel injector service pack comprising:

(A) a replacement fuel injector having a specific time delay that is experimentally determined for that particular fuel injector; and (B) a computer readable storage medium having stored thereon:

(i) a data file containing a serial number and the specific time delay for the replacement fuel injector; and (ii) a computer program comprising instructions which, when executed by a computer, cause the computer to:

(1) allow identification of a cylinder in a fuel injected engine for which a fuel injector is to be replaced;

(2) read end store existing fuel injector time delay data from an ECU of the fuel injected engine; and (3) write the particular time delay from the data file to the ECU for use with the replacement fuel injector.

7. The fuel injector service pack of claim 6 wherein the computer readable storage medium further comprises a log file that is used by the computer program to track how the data file is used and ensure that the specific time delay is not used with another fuel injector.

8. The fuel injector service pack of claim 6 wherein the computer program further causes the computer to:

allow restoration of the existing fuel time delay data if the replacement fuel injector did not solve a user problem and restricts use of the existing fuel injector time delay data and the original fuel injector by:

writing a serial number of the replacement fuel injector to the ECU when the custom time delay data are written to the ECU;

if the last use of the computer program was to replace data, read and compare each fuel injector serial number in the ECU with the serial number of the replacement fuel injector as stored in the data file; and if a match is present:

allow the existing fuel injector time delay data to be written back into the ECU; and direct that the original fuel injector be installed in the cylinder identified.

* * * * *